(12) United States Patent
Schuler

(10) Patent No.: US 6,982,839 B2
(45) Date of Patent: Jan. 3, 2006

(54) OPTICAL TRANSMITTER AND RECEIVER ARRANGEMENT

(75) Inventor: Werner Schuler, Gutach-Bleibach (DE)

(73) Assignee: Sick AG, Waldkirch/Breisgau (DE)

( * ) Notice: Subject to any disclaimer, the term of this patent is extended or adjusted under 35 U.S.C. 154(b) by 0 days.

(21) Appl. No.: 10/779,566

(22) Filed: Feb. 13, 2004

(65) Prior Publication Data

US 2004/0207933 A1    Oct. 21, 2004

(30) Foreign Application Priority Data

Feb. 26, 2003    (DE) ................. 103 08 285

(51) Int. Cl.
G02B 9/00    (2006.01)

(52) U.S. Cl. ..................... 359/738; 250/216
(58) Field of Classification Search ............... 359/738, 359/740; 250/216, 221
See application file for complete search history.

(56) References Cited

U.S. PATENT DOCUMENTS

| 3,805,061 | A | 4/1974 | DeMissimy et al. ..... 250/208.3 |
| 4,015,122 | A | 3/1977 | Rubinstein .................. 250/221 |
| 4,267,443 | A | 5/1981 | Carroll et al. .............. 250/221 |
| 4,302,105 | A | 11/1981 | Sick ........................... 250/224 |
| 4,769,535 | A | 9/1988 | Sasaki et al. ............... 250/221 |
| 6,335,548 | B1 * | 1/2002 | Roberts et al. ............... 257/98 |
| 6,342,670 | B1 * | 1/2002 | Lin et al. .................... 136/251 |

FOREIGN PATENT DOCUMENTS

| DE | 3633181 A1 | 4/1988 |
| DE | 43 12 947 C1 | 6/1994 |
| DE | 43 04 343 A1 | 8/1994 |
| DE | 44 06 906 A1 | 9/1995 |
| DE | 44 38 798 C2 | 2/1997 |
| DE | 197 18 157 A1 | 11/1998 |
| DE | 198 27 125 A1 | 12/1999 |
| DE | 198 55 220 A1 | 5/2000 |
| DE | 198 55 828 A1 | 6/2000 |
| DE | 197 12 828 A1 | 1/2001 |
| EP | 0 060 021 | 9/1982 |
| EP | 0 867 732 A2 | 3/1998 |
| WO | WO 96/41126 | 12/1996 |

* cited by examiner

Primary Examiner—Scott J. Sugarman
Assistant Examiner—Darryl J. Collins
(74) Attorney, Agent, or Firm—Harness, Dickey & Pierce

(57) ABSTRACT

The invention relates to an optical arrangement comprising a plurality of transmitter elements and/or receiver elements, a plurality of diffractive and/or refractive optical elements and an optical carrier for the diffractive and/or refractive optical elements, wherein the optical system carrier has diaphragm apertures in whose region the diffractive and/or refractive optical elements are connected to the optical system carrier by means of an injection molding process or of a casting process. The invention furthermore relates to a method of manufacturing such an optical arrangement.

41 Claims, 2 Drawing Sheets

OPTICAL TRANSMITTER AND RECEIVER ARRANGEMENT

CROSS-REFERENCE TO RELATED APPLICATIONS

This application claims the benefit of German Patent Application 103 08 285.9 filed on Feb. 26, 2003. The disclosure of the above application is incorporated herein by reference.

1. Field of the Invention

The invention relates to an optical arrangement comprising a plurality of transmitter elements and/or receiver elements, a plurality of diffractive and/or refractive optical elements and an optical system carrier for the diffractive and/or refractive optical elements. The invention furthermore relates to a method of manufacturing such an optical arrangement.

2. Background of the Invention

Optical arrangements of the said type are used e.g. when a defined protected zone has to be monitored for the intrusion of objects. Typical applications are, for example, light curtains for automatic production plants which trigger a stopping of the production plant when an object intrudes into a protected zone in order to avoid injury to persons or damage to material in this manner.

An optical arrangement of the initially named kind is known from the European patent application EP 0 867 732. The assembly described there includes e.g. a plurality of transmitter elements transmitting light and a plurality of receiver elements receiving light, a plurality of diffractive or refractive optical elements associated with the transmitter elements and with the receiver elements and a transparent front cover. The diffractive and/or refractive optical elements are formed directly in the transparent front cover, and are in particular impressed or cast into it, such that the front cover at the same time forms a carrier element for the optical elements.

The one-piece assembly of the front screen and of the optical elements admittedly has the advantage, on the one hand, of a simple and economic manner of manufacture, but it is still necessary, on the other hand, to adjust the optical elements precisely with respect to the respectively associated diaphragm or the associated tube, which causes a disadvantageous installation effort. Moreover, the one-piece assembly of the front screen and of the optical elements does not produce any advantages if no front screen is required in the region of the optical elements in specific applications.

Finally, temperature fluctuations or aging processes of the materials used can result in an optical element being displaced with respect to the associated diaphragm or the associated tube such that an error-free function of the overall optical arrangement can no longer be ensured.

SUMMARY OF THE INVENTION

It is the object of the present invention to provide an optical arrangement of the initially named kind which can be installed with a low effort with a simple and economic manner of manufacture of its individual components and which in particular also has an increased functional reliability with respect to the prior art. Furthermore, a method for the simple, efficient and cost-favorable production and installation of the said arrangement should be provided.

The first named objects are satisfied by an arrangement in accordance with the invention in accordance with claim 1 and in particular by an optical arrangement which has a plurality of transmitter elements and/or receiver elements, a plurality of diffractive and/or refractive optical elements and an optical system carrier for the diffractive and/or refractive optical elements, with the optical system carrier having diaphragm apertures in whose region the diffractive and/or refractive optical elements are connected to the optical system carrier by means of an injection molding process or of a casting process.

The last-named object is satisfied by a method in accordance with the invention in accordance with claim 21 and in particular by a method of manufacturing an optical arrangement of the initially named kind, in which, in a first method step, the optical system carrier is provided at least with diaphragm apertures and in which, in a further method step, the diffractive and/or refractive optical elements are connected to the optical system carrier in the region of the diaphragm apertures by means of an injection molding process or of a casting process.

In accordance with the invention, the injection molding process or the casting process used for the manufacture of the diffractive and/or refractive optical elements is therefore simultaneously used to establish a connection between the diffractive and/or refractive optical elements and the optical system carrier such that a separate workstep for the establishment of this connection can be omitted in an economic manner.

Since the diaphragm apertures to be associated with the diffractive and/or refractive optical elements are already formed in the optical system carrier, the injection molding of the diffractive and/or refractive optical elements to the optical system carrier can take place such that the diaphragm apertures or points standing in defined relationships with the diaphragm apertures serve as reference points for the injection molding process or for the casting process. It can be ensured in this manner that the diffractive and/or refractive optical elements are precisely adjusted relative to the diaphragm apertures without a separate workstep being needed for this.

It is ensured by the fixed connection created in the manner in accordance with the invention between the diffractive and/or refractive optical elements and the optical system carrier having the diaphragm apertures that no significant displacement takes place between diffractive and/or refractive optical elements and the respectively associated diaphragm apertures due to temperature fluctuations and aging processes such that an error-free function of the overall optical arrangement is ensured in this respect.

The diffractive or refractive optical elements used in accordance with the invention and manufactured by means of an injection molding process or of a casting process bring about a beam shaping of the radiation transmitted by the transmitter elements or incident onto the receiver elements. They can be made as spherical lenses or as aspheric lenses, as cylinder lenses or also as Fresnel lenses.

It is advantageous for the plurality of optical elements not to be connected to one another as a unit, but to be arranged individually on the optical system carrier, since then, on the one hand, no forces can act between the different optical elements as a consequence of temperature changes and, on the other hand, any desired positioning of the optical elements can take place. The optical elements individually arranged on the optical system carrier can be spaced apart from one another or adjoin one another.

To ensure the connection of the optical elements to the optical system carrier in accordance with the invention, the optical elements can have at least one undercut each which is manufactured as part of the injection molding process or of the casting process and into which the rim of the associated diaphragm aperture engages.

Additionally or alternatively, the optical elements can also have projections which are also produced as part of the injection molding process or of the casting process and which comprise undercuts into which the rims of additional fastening apertures formed in the optical system carrier engage.

It is advantageous if a number of additional fastening apertures are associated with each diaphragm aperture, with the additional fastening apertures associated with a diaphragm aperture each being substantially uniformly distributed around this diaphragm aperture in order thus to achieve a particularly stable fastening.

Since the spacing between two adjacent optical elements can vary from application to application and it is desirable to employ a single type of optical system carrier for as many applications as possible, it can be meaningful to provide an optical system carrier with a high number of diaphragm apertures arranged e.g. along a straight line. For one application, for example, all diaphragm apertures can thus be fitted with optical elements, whereas in other applications only some of the diaphragm apertures, for example only every third diaphragm aperture, are provided with an optical element. The stocking of different optical system carrier types can thereby be reduced to a minimum.

Furthermore, it can also be meaningful within the framework of the invention to design the optical system carrier such that the diaphragm apertures present in it are further developed to form diaphragm tubes such that an exact positioning of the optical elements results with respect to these diaphragm tubes by the injection molding process or by the casting process.

The majority of applications, in particular a light grid application, requires a strip-like assembly of the optical system carrier. It is preferred for the optical system carrier to be made as a stamped strip since an economic manufacture thus becomes possible.

In order to achieve a positioning accuracy which is as high as possible with an automatic fitting of the optical system carrier with optical elements, it is favorable to provide the optical system carrier with recesses in the rim region for this purpose which serve for the centration and alignment of the optical system carrier in an injection molding machine.

Depending on the application, optical system carriers fitted with the optical elements can be designed as a rigid element or as flexible, in particular windable. In a flexible design, the advantage results that the respectively required optical system carriers are wound off a roll and can be cut off at a respectively desired length.

Alternatively, however, it is also possible to design the optical system carrier as a rigid strip which can be cut to length.

The transmitter elements and/or receiver elements of an arrangement in accordance with the invention are as a rule attached to an electronic system carrier which can be made as rigid or as flexible. It is preferably an electronic board. Typically, in each case at least one optical element, one diaphragm aperture or one tube and one transmitter element or receiver element are arranged coaxially along the optical axis of the optical element.

In accordance with a further preferred embodiment of the invention, it is favorable to connect the optical system carrier provided with the diaphragm apertures and with the optical elements to the electronic system carrier provided with the transmitter elements and/or receiver elements such that the said coaxial arrangement is produced. This connection can, for example, be established by means of a snap connection.

To protect the unit produced in this manner from undesired environmental influences such as, for example, the penetration of dirt or moisture or to provide it with mechanical stability, it is advantageous to accommodate it in a housing. An extrusion section, preferably of aluminum, is suitable for this purpose.

A U-shaped extrusion section can in particular be employed here. The previously named unit can be pushed into the extrusion section due to holding grooves arranged at a suitable position in the extrusion section such that the side fitted with the optical elements points in the direction of the open side of the extrusion section.

The invention can in particular be employed in the manufacture of light curtains. A pair of two optical arrangements in accordance with the invention can, for example, be used here, of which one is designed purely as a transmitter arrangement and the other is designed purely as a receiver arrangement. The transmitter arrangement and the receiver arrangement are then oriented in a manner disposed opposite one another such that the beams transmitted by the transmitter elements can be detected by the oppositely disposed receiver arrangement.

As initially mentioned, the present invention moreover has the underlying object of providing a method for the simple, efficient and cost-favorable production and installation of the said arrangement. Such a method can proceed as follows. In a first method step, the optical system carrier is at least provided with diaphragm apertures. Equally, in particular simultaneously further fastening openings and recesses can be introduced into the optical system carrier for the purpose of positioning. This preferably takes place by a stamped processes, with it being advantageous for even the optical system carrier itself to be stamped out of an areal material by this stamping process. In the latter case, the optical system carrier is therefore made including all required diaphragm apertures, fastening apertures and recesses by one single stamping process.

In a further method step, the diffractive and/or refractive optical elements are connected to the optical system carrier in the region of the aperture openings by means of an injection molding process or of a casting process. This can take place, for example, in that the optical system carrier is surrounded on both sides in the region of the diaphragm apertures and/or of the fastening apertures by a two-part injection molding tool. The injection molding tool is made such that the optical elements are formed in the desired shape during injection molding and are simultaneously connected to the optical system carrier via the diaphragm aperture and/or via the fastening apertures.

Either a single optical element or a group of optical elements can be connected to the optical system carrier by means of a single injection molding process or of a casting process, with the latter alternative resulting in improved efficiency of the manufacturing process.

The introduction of the diaphragm apertures, of the fastening apertures and of the recesses into the optical system carrier is generally suitable, like the injection molding or casting of the diffractive and/or refractive optical elements, for fully automatic or semi-automatic production in a quasi endless process. A strip-shaped raw optical system carrier should be made flexible and be present in wound up form for this purpose. In production, the raw optical system carrier is then successively unwound and is provided with the diaphragm apertures, optionally also with fastening apertures or recesses, by means of a periodically recurring stamping process. Subsequently, the optical elements are injected onto the optical system carrier in the region of the diaphragm apertures by means of a likewise periodically recurring injection molding process or casting process. The optical system carrier strip worked in this way can subsequently either be wound up again or, however, cut in certain lengths in order thus to obtain the optical system carrier ultimately employed.

It is equally possible to divide the described quasi endless process into a plurality of quasi endless processes. It can, for example, be meaningful in a first quasi endless process to wind off the raw optical system carrier present in wound up form, to provide it with all required apertures and recesses and subsequently to wind it up again. In a second quasi endless process, the optical system carrier now prepared in this manner and wound up again can again be wound off and be provided with the optical elements by means of an injection molding process or of a casting process.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will be described in more detail in the following with reference to embodiments and to the drawings; there are shown in these.

DETAILED DESCRIPTION OF THE PREFERRED EMBODIMENTS

Figure 1:
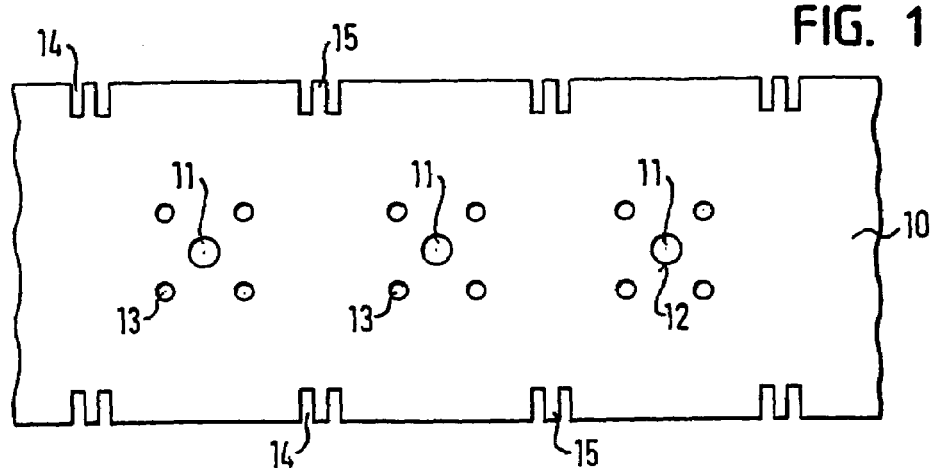
FIG. 1 a plan view of a section of an optical system carrier used in accordance with the invention.

The following description of the preferred embodiment is merely exemplary in nature and is in no way intended to limit the invention, its application, or uses. For purposes of clarity, the same reference numbers will be used in the drawings to identify similar elements.

FIG. 1 shows a strip-like section of an optical system carrier 10 which is provided with a total of three circular diaphragm apertures 11 arranged equidistantly along a straight line.

The optical system carrier 10 can be made from light-impermeable material and in particular consist of metal or plastic.

Four additional fastening apertures 13, which serve for the fastening of the diffractive and/or refractive optical elements not shown in FIG. 1, are arranged uniformly around each of the diaphragm apertures 11. Recesses 14 are applied to both rims of the optical system carrier 10, extend perpendicular to the longitudinal axis of the optical system carrier 10 and each consist of two cut-outs arranged next to one another such that a respective tab 15 is formed between these cut-outs. The recesses 14 are in turn arranged equidistantly to one another and are located in each case—with respect to the longitudinal axis of the optical system carrier 10—centrally between two diaphragm openings 11.

Figure 2:
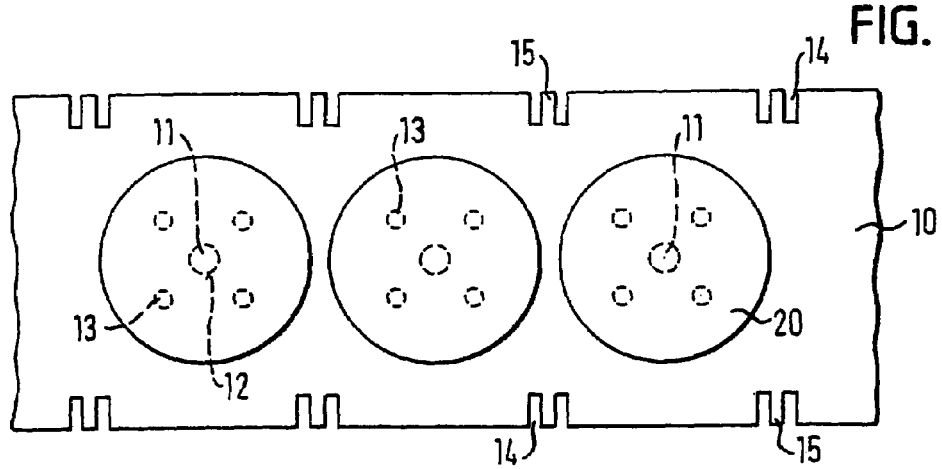
FIG. 2 a view in accordance with FIG. 1 in which the optical system carrier is fitted with diffractive or refractive optical elements.

FIG. 2 shows the optical system carrier 10 in accordance with FIG. 1, but provided with diffractive and/or refractive optical elements 20. The optical elements 20 are each made as circular lenses whose optical axes coincide with the centers of the circular diaphragm apertures 11. The four fastening openings 13 associated with an optical element 20 are covered by the respective optical element 20 as is the associated diaphragm aperture 11 such that fastening apertures 13 and diaphragm apertures 11 are accordingly only shown in broken lines in FIG. 2.

Figure 3:
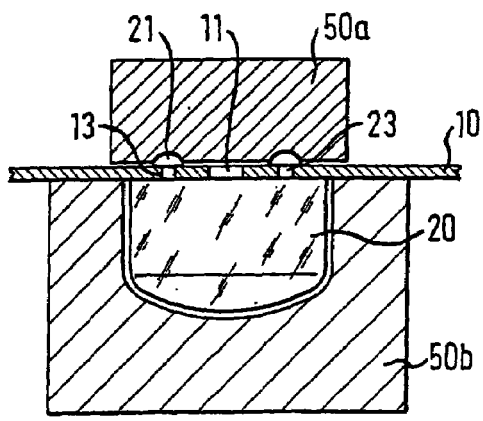
FIG. 3 a partly sectioned side view of an optical system carrier in accordance with FIG. 2 during the production process with injection molding tool in place.

FIG. 3 shows how a diffractive or refractive optical element 20 is injected onto an optical system carrier 10 by means of an injection molding process. The upper injection molding tool 50a and the lower injection molding tool 50b can be seen which together surround the diaphragm aperture 11 and the fastening apertures 13. The material for a diffractive or refractive optical element 20 is injected into the closed tool 50a, 50b. The optical element 20 is provided with integrally molded, mushroom-shaped projections 21 which have undercuts 23 and which extend through the fastening apertures. The rims of the fastening apertures 13 engage into the said undercuts 23 such that the optical element 20 is fixedly connected to the optical system carrier 10.

Figure 4:
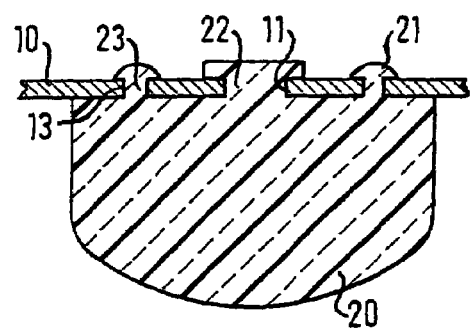
FIG. 4 a sectioned side view of an optical system carrier in accordance with the invention which is connected to a diffractive or refractive optical element.

FIG. 4 shows a diffractive or refractive optical element 20 injected onto an optical system carrier 10. Unlike FIG. 3, the optical element 20 is not only connected to the optical system carrier 10 via projections 21 with under-cuts 23 formed thereon. A mushroom-shaped spigot extending through the diaphragm aperture 11 is rather additionally molded onto the optical element 20 and the rim of the diaphragm aperture 11 engages into its undercut 22 in order thus to fix the optical element 20 even better to the optical system carrier 10.

Figure 5:
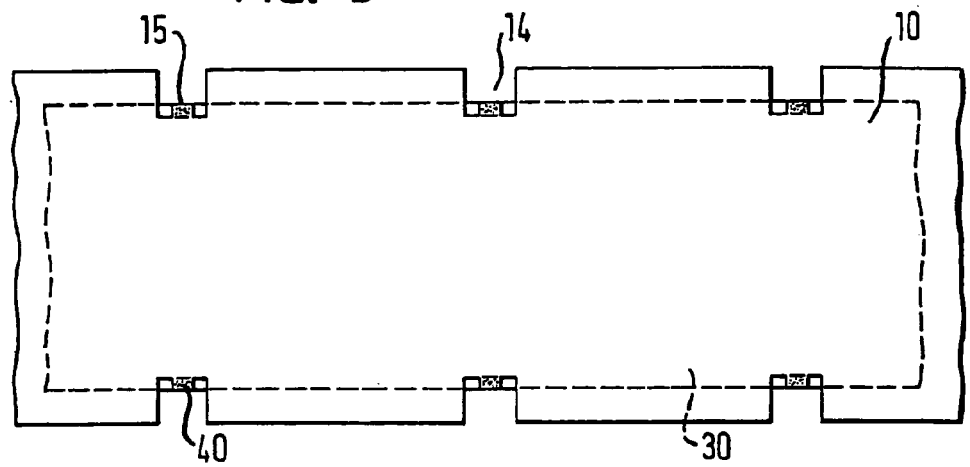
FIG. 5 an electronic system carrier connected to a schematically shown optical system carrier.

FIG. 5 shows a schematically represented optical system carrier 10, shown without diaphragm apertures and fastening apertures, with an electronic system carrier 30 arranged thereunder. The width of the electronic system carrier 30 is somewhat lower than the width of the optical system carrier 10. The tabs 15 (see FIG. 1) formed in the region of the recesses 14 of the optical system carrier 10 at the rim side are bent downwardly at right angles and their front face is soldered at the solder points 40 to the electronic system carrier 30 in order thus to establish a fixed, immovable connection between the optical system carrier 10 and the electronic system carrier 30. A snap connection could also be used instead of a solder connection.

Figure 6:
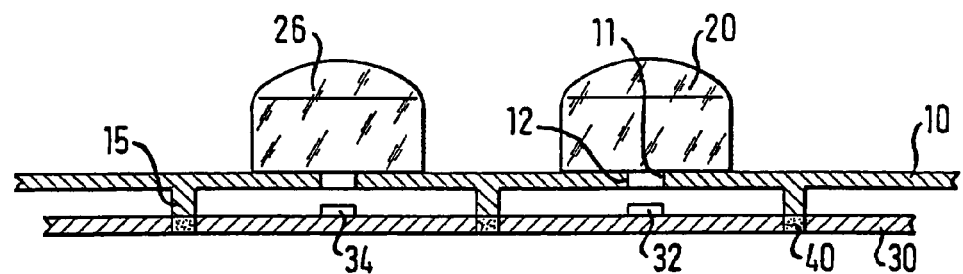
FIG. 6 a sectioned side view of an optical system carrier which is provided with diffractive and/or refractive optical elements and to which an electronic system carrier is fastened.

FIG. 6 shows the arrangement in accordance with FIG. 5 in a sectioned side view. In addition, the diffractive or refractive optical elements 20, 26 arranged at the diaphragm apertures 11 as well as a transmitter element 32 and a receiver element 34 are shown in FIG. 6. For reasons of clarity, the connection between the optical elements 20 and the optical system carrier 10 is not shown.

The transmitter element 32 and the receiver element 34 are fastened on the electronic system carrier 30 respectively aligned to the optical axis of the associated optical element 20, 26. The transmitter element 32 can be any desired radiation source, in particular a light emitting diode, an infrared transmitter diode or a laser diode. The radiation can be transmitted either continuously or in modulated form by the transmitter element 32. The receiver element 34 can be made as a light-sensitive semiconductor, for example as a photodiode, a phototransistor or as a light sensitive resistor.

When operating the arrangement in accordance with FIG. 6, the radiation emitted by the transmitter element 32 can be shaped in a suitable manner by means of the optical element 20 such that it is reflected by a reflector—not shown—to the optical element 26 which ultimately deflects the received radiation in a beam to the receiver element 34.

Figure 7:
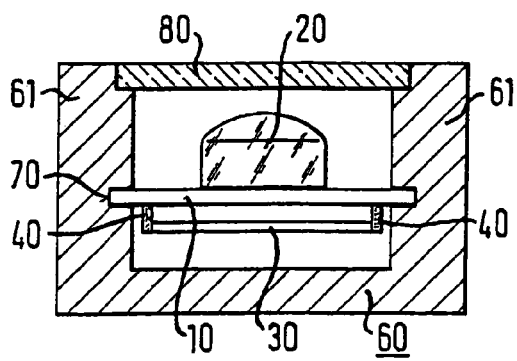
FIG. 7 a partly sectioned front face view of an extrusion section fitted with an optical system carrier and an electronic system carrier in accordance with a first embodiment.

FIG. 7 shows a section through a U-shaped extrusion section 60 whose two limbs 61 are provided with inwardly opening holding grooves 70. A unit consisting of a fitted optical system carrier 10 and of an electronic board 30 fastened thereto is pushed into the holding grooves 70. The optical system carrier 10 projects laterally beyond the electronic board 30. The projecting rims of the optical system carrier 10 are guided in the holding grooves 70 such that the total unit 10, 30 is held in the extrusion section 60.

A transparent cover screen 80 for the radiation used is provided in the region of the open side of the U-shaped extrusion section 60 in order to protect the optical arrangement from environmental influences. If required, the cover screen 80 can consist of an optical filter material.

Figure 8:
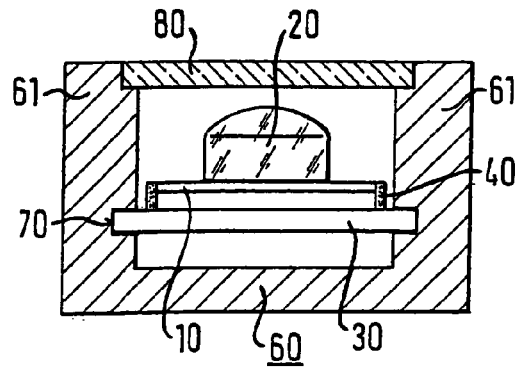
FIG. 8 a partly sectioned front face view of an extrusion section fitted with an optical system carrier and an electronic system carrier in accordance with a further embodiment.

The illustration shown in FIG. 8 corresponds to the illustration in accordance with FIG. 7, but here the electronic board 30 projects laterally beyond the optical system carrier 10. The unit consisting of the electronic system carrier 30 and the optical system carrier 10 is here accordingly guided into the holding grooves 70 of the extrusion section 60 and held therein at the projecting rims of the electronic carrier 30.

Alternatively to the embodiments shown in FIGS. 7 and 8, it is also possible to provide respectively separate holding grooves for the electronic board 30 and the optical system carrier 10 in an extrusion section 60. In this case, it is then no longer necessary additionally to connect the electronic board 30 and the optical system carrier 10 to one another. Only a relative displacement between the electronic board 30 and the optical system carrier 10 along the longitudinal axis of the extrusion section 60 must be prevented by means of suitable mechanical measures.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An optical arrangement comprising a plurality of transmitter elements and/or receiver elements, a plurality of diffractive and/or refractive optical elements and an optical system carrier for the diffractive and/or refractive optical elements wherein the optical system carrier has diaphragm apertures in whose region the diffractive and/or refractive optical elements are connected to the optical system carrier by means of an injection molding process or of a casting process; and wherein the diffractive and/or refractive optical elements each have at least one undercut into which the rim of the diaphragm aperture engages.

2. An optical arrangement in accordance with claim 1, wherein the diffractive and/or refractive optical elements are made as lenses.

3. An optical arrangement in accordance with claim 1, wherein the diffractive and/or refractive optical elements are attached to the optical system carrier individually and in particular spaced apart from one another or adjoining one another.

4. An optical arrangement in accordance with claim 1, wherein the diffractive and/or refractive optical elements have projections engaging into fastening apertures and having undercuts.

5. An optical arrangement in accordance with claim 1, wherein only specific diaphragm apertures are provided with diffractive and/or refractive optical elements.

6. An optical arrangement in accordance with claim 1, wherein the diaphragm apertures are made as diaphragm tubes.

7. An optical arrangement in accordance with claim 1, wherein the optical system carrier consists of light-impermeable material, in particular of metal or plastic.

8. An optical arrangement in accordance with claim 1, wherein the optical system carrier is made as a stamped strip.

9. An optical arrangement in accordance with claim 1, wherein the optical system carrier is made as a strip which can be cut to length.

10. An optical arrangement in accordance with claim 1, wherein the optical system carrier has a marginal region and has recesses in the marginal region.

11. An optical arrangement in accordance with claim 1, wherein the optical system carrier is made as a rigid element or as flexible, in particular windable.

12. An optical arrangement in accordance with claim 1, wherein the transmitter elements and/or the receiver elements are arranged on a rigid or flexible electronic system carrier, preferably on an electronic board.

13. An optical arrangement in accordance with claim 12, wherein the electronic system carrier provided with the transmitter elements and/or with the receiver elements and the optical system carrier are connected to one another to form a unit by means of a snap connection.

14. An optical arrangement in accordance with claim 13, wherein the unit, consisting of the optical system carrier provided with diffractive and/or refractive optical elements and of the electronic system carrier connected thereto and provided with the transmitter elements and/or the receiver elements, is arranged in an extrusion section, preferably in an aluminum section.

15. An optical arrangement in accordance with claim 14, wherein the extrusion section is made in U shape.

16. An optical arrangement in accordance with claim 14, wherein the extrusion section has holding grooves for the optical system carrier and/or the electronic system carrier.

17. A light grid having at least one optical arrangement in accordance with claim 1.

18. A method for the manufacture of an optical arrangement comprising a plurality of transmitter elements and/or receiver elements, a plurality of diffractive and/or refractive optical elements and an optical system carrier for the diffractive and/or refractive optical elements, wherein in a first method step, the optical system carrier is at least provided with diaphragm apertures, in a further method step, the diffractive and/or refractive optical elements are connected to the optical system carrier in the region of the aperture openings by means of an injection molding process or of a casting process; and wherein the diffractive and/or refractive optical elements each have at least one undercut into which the rim of the diaphragm aperture engages.

19. A method in accordance with claim 18, wherein a single optical element or a group of optical elements are connected to the optical system carrier by means of a single injection molding process or casting process.

20. A method in accordance with claim 18, wherein the connection of the diffractive and/or refractive optical elements to the optical system carrier takes place in a quasi endless method, with the optical system carrier present in wound-up form being unwound and being supplied to the injection molding machine or casting machine; and wherein, subsequently, the optical system carrier provided with the diffractive and/or refractive optical elements is cut to length.

21. A method for the manufacture of an optical arrangement comprising a plurality of transmitter elements and/or receiver elements, a plurality of diffractive and/or refractive optical elements and an optical system carrier for the diffractive and/or refractive optical elements, characterized wherein in a first method step, the optical system carrier is at least provided with diaphragm apertures, in a further method step, the diffractive and/or refractive optical elements are connected to the optical system carrier in the region of the aperture openings by means of an injection molding process or of a casting process; and wherein the optical system carrier has, in addition to the diaphragm apertures, additional fastening apertures for the diffractive and/or refractive optical elements.

22. A method in accordance with claim 21, wherein a single optical element or a group of optical elements are connected to the optical system carrier by means of a single injection molding process or casting process.

23. A method in accordance with claim 21, wherein the connection of the diffractive and/or refractive optical elements to the optical system carrier takes place in a quasi endless method, with the optical system carrier present in wound-up form being unwound and being supplied to the injection molding machine or casting machine; and wherein, subsequently, the optical system carrier provided with the diffractive and/or refractive optical elements is cut to length.

24. An optical arrangement comprising a plurality of transmitter elements and/or receiver elements, a plurality of diffractive and/or refractive optical elements and an optical system carrier for the diffractive and/or refractive optical elements, wherein the optical system carrier has diaphragm apertures in whose region the diffractive and/or refractive optical elements are connected to the optical system carrier by means of an injection molding process or of a casting process; and wherein the optical system carrier has, in addition to the diaphragm apertures, additional fastening apertures for the diffractive and/or refractive optical elements.

25. An optical arrangement in accordance with claim 24, wherein a number of additional fastening apertures are associated with each diaphragm aperture, with the additional fastening apertures associated with a diaphragm aperture each being arranged substantially uniformly distributed around this diaphragm aperture.

26. An optical arrangement in accordance with claim 24, wherein the diffractive and/or refractive optical elements are made as lenses.

27. An optical arrangement in accordance with claim 24, wherein the diffractive and/or refractive optical elements are attached to the optical system carrier individually and in particular spaced apart from one another or adjoining one another.

28. An optical arrangement in accordance with claim 24, wherein the diffractive and/or refractive optical elements have projections engaging into the fastening apertures and having undercuts.

29. An optical arrangement in accordance with claim 24, wherein only specific diaphragm apertures are provided with diffractive and/or refractive optical elements.

30. An optical arrangement in accordance with claim 24, wherein the diaphragm apertures are made as diaphragm tubes.

31. An optical arrangement in accordance with claim 24, wherein the optical system carrier consists of light-impermeable material, in particular of metal or plastic.

32. An optical arrangement in accordance with claim 24, wherein the optical system carrier is made as a stamped strip.

33. An optical arrangement in accordance with claim 24, wherein the optical system carrier is made as a strip which can be cut to length.

34. An optical arrangement in accordance with claim 24, wherein the optical system carrier has recesses in its marginal region.

35. An optical arrangement in accordance with claim 24, wherein the optical system carrier is made as a rigid element or as flexible, in particular windable.

36. An optical arrangement in accordance with claim 24, wherein the transmitter elements and/or the receiver elements are arranged on a rigid or flexible electronic system carrier, preferably on an electronic board.

37. An optical arrangement in accordance with claim 36, wherein the electronic system carrier provided with the transmitter elements and/or with the receiver elements and the optical system carrier are connected to one another to form a unit by means of a snap connection.

38. An optical arrangement in accordance with claim 37, wherein the unit, consisting of the optical system carrier provided with diffractive and/or refractive optical elements and of the electronic system carrier connected thereto and provided with the transmitter elements and/or the receiver elements, is arranged in an extrusion section, preferably in an aluminum section.

39. An optical arrangement in accordance with claim 38, wherein the extrusion section is made in U shape.

40. An optical arrangement in accordance with claim 38, wherein the extrusion section has holding grooves for the optical system carrier and/or the electronic system carrier.

41. A light grid having at least one optical arrangement in accordance with claim 24.

* * * * *